United States Patent [19]

Clurman

[11] Patent Number: 4,477,894
[45] Date of Patent: Oct. 16, 1984

[54] PROTECTIVE CARTRIDGE FOR DISC RECORD

[75] Inventor: Stanley P. Clurman, Cherry Hill, N.J.

[73] Assignee: RCA Corporation, New York, N.Y.

[21] Appl. No.: 406,883

[22] Filed: Aug. 10, 1982

[51] Int. Cl.³ .............................................. G11B 25/04
[52] U.S. Cl. ..................................... 369/270; 369/291; 360/133
[58] Field of Search ...................... 369/270, 291, 77.2, 369/292; 360/133

[56] References Cited

U.S. PATENT DOCUMENTS

| | | | |
|---|---|---|---|
| 3,156,472 | 11/1964 | Brock | 369/255 |
| 4,002,826 | 1/1977 | Iemenschot | 369/270 |
| 4,064,545 | 12/1977 | Goss | 360/133 |
| 4,078,246 | 3/1978 | Berthoux et al. | 360/133 |
| 4,097,895 | 6/1978 | Spong | 358/128 |
| 4,177,491 | 12/1979 | Jahn | 360/135 |
| 4,185,308 | 1/1980 | Fujioka | 360/97 |
| 4,222,071 | 9/1980 | Bell et al. | 358/128.5 |
| 4,286,790 | 9/1981 | Siryj et al. | 369/36 |
| 4,409,630 | 10/1983 | Saito | 360/99 |

FOREIGN PATENT DOCUMENTS 149011 12/1978 Japan .................................. 369/270
43099 9/1983 Japan .

OTHER PUBLICATIONS

U.S. patent application Ser. No. 316,659, (C. W. Reno et al.) filed Oct. 30, 1981.

Primary Examiner—Steven L. Stephan
Attorney, Agent, or Firm—Joseph S. Tripoli; Robert L. Troike; Christopher Lyle Maginniss

[57] ABSTRACT

A protective cartridge is provided for a disc record in a disc playback/record system. The protective cartridge is provided with a compliant annular section and a central portion. A first annular magnet for use in holding the disc record against a turntable, while the turntable rotates, is positioned in the central portion. A ram which includes a second annular magnet is arranged such that its polarity is opposite to the first magnet. When the ram is lowered an engagement of the disc record is effected. That is, the second magnet repels the first magnet to cause the first magnet to hold the disc record against the turntable.

10 Claims, 3 Drawing Figures

PROTECTIVE CARTRIDGE FOR DISC RECORD

BACKGROUND OF THE INVENTION

The present invention relates to disc record systems for use in recording and retrieving information from a disc record and, more particularly, to a cartridge system for protecting the information bearing surfaces of a disc record used in such systems.

High density optical recording systems which may be used for recording and playing back information are known in the prior art. For example, U.S. Pat. No. 4,097,895 entitled, "MULTI-LAYER OPTICAL RECORD" issued to F. W. Spong on June 27, 1978, describes an optical disc record/playback system wherein data is recorded in the form of pits in an absorptive coating on the surface of an optical disc by focusing a high intensity light beam on the surface. For example, in the Spong system, approximately $10^{11}$ bits of information can be stored on one side of a disc-shaped record medium having a 30 cm. diameter.

In optical recording systems involving high density information records, such as the Spong system, dust, finger prints, or the like, or other debris on the information bearing surface of the disc record may adversely affect the operation of the system. Accordingly, it is desirable to provide a disc/cartridge combination wherein the disc record is enclosed in a protective cartridge.

In optical recording or retrieving systems the disc record is positioned on a turntable, or the like, to effect rotational relative motion between the information bearing surface of the disc and the focused light spot. In such systems the disc record should be accurately aligned on the turntable during recording and retrieving operations. Further, the disc record should be pressed positively against the turntable while the turntable rotates.

In optical data processing systems wherein the disc remains in the cartridge during use and storage, it is desirable to facilitate the method and apparatus for holding the disc on the surface. Automatic actuation of the hold-down for holding the record on the turntable is of particular interest with regard to "jukebox" systems, for example, of a type described in U.S. Pat. No. 4,286,790, entitled, "OPTICAL DISC CHANGER APPARATUS" issued to B. W. Siryj et al. on Sept. 1, 1981. In "jukebox" systems a plurality of discs, each enclosed in its respective cartridge, are stored in slots, stacks, or other arrays, permitting any of the plurality of disc/cartridge combinations to be selected out of storage and placed on the turntable. In accordance with the present invention the removal from storage, placement on the turntable and return to storage may be done automatically, or manually, with relative ease and without removing the disc record from the cartridge.

SUMMARY OF THE INVENTION

In accordance with the principles of the present invention an apparatus is provided for enclosing and holding a disc record in a disc record system. The disc record system is used in recovering or recording information signals in a disc record medium. The system includes a rotatable support for the record medium. The apparatus includes an enlosure having a protective cavity for enclosing the disc record medium. The protective cavity of the enclosure houses the disc record medium. Further, the apparatus includes a magnetic holder for magnetically holding the record disc on the rotatable support. The magnetic holder is arranged to move axially with respect to the disc record. A retainer for retaining the magnetic holder is coupled to the enclosure.

In accordance with one aspect of the present invention the apparatus is provided with an actuator for actuating the magnetic holder. The actuator is arranged such that the disc record is fixedly mounted between the magnetic holder and the rotatable support when the actuator urges the magnetic holder to engage the disc record.

In accordance with another aspect of the present invention the apparatus includes a cartridge for enclosing the disc record. The cartridge has a cavity, the cavity has a conically shaped surface. Further, the apparatus includes a magnetic holder for holding the disc record against the rotatable support. The conical shape of a surface of the magnetic holder is complementary to the conical shape of a surface of the cavity.

DESCRIPTION OF THE DRAWING

Other features and advantages of the invention will be more fully understood from the following detailed description of the preferred embodiment, the appended claims and the accompanying drawing in which:

DESCRIPTION OF A PREFERRED EMBODIMENT OF THE INVENTION

Figure 1:
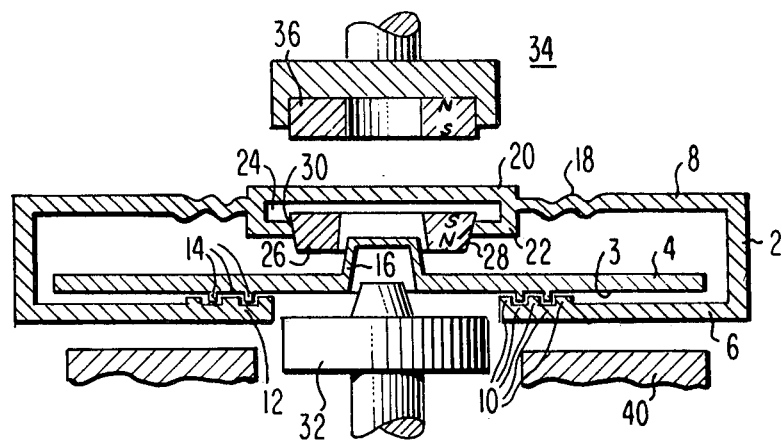
FIG. 1 is a side view, partially in cross-section, of a protective cartridge having a disc record enclosed therein, the record being positioned in close proximity to a turntable of a disc record/playback system.

Referring to FIG. 1, protective cartridge 2 is shown enclosing disc record 4. Disc record 4 may be used in an optical record/playback system of a type described in U.S. patent application Ser. No. 316,659, entitled, "MULTI-BEAM OPTICAL RECORD AND PLAYBACK APPARATUS" filed for C. W. Reno on Oct. 30, 1981. In accordance with the Reno system, a light beam from a high power laser is split into a plurality of beams and focused onto an information surface of a disc record.

In most optical systems, recording is achieved when the intensity of the focused light beam has a sufficient magnitude to effect ablation of the recording layer on the surface of the disc record. Illustratively, the disc record in this system may be of a type described in U.S. Pat. No. 4,222,071, entitled, "INFORMATION RECORD" issued on Sept. 9, 1980, to A. E. Bell. In accordance with one technique of recording by ablation the material of the recording layer is elevated to an ablation temperature. In the recording process the material of the recording layer vaporizes or melts forming a pit therein. With suitable modulation of the intensity of the light beam in accordance with the recording signal, as successive regions of the disc record pass through the light beam path, an information track may be formed comprising pits in regions where the material is ablated separated by undisturbed regions of the recording layer (that were not subject to exposure by the high intensity beam).

In the playback mode, the intensity of the light source is set at a constant level, which is below the recording level. The light beam follows the previously described information track on the disc record surface. The intensity of the light falling upon a photodetector alternates between a minimum level and a maximum level as the successive regions of the information track pass through the path of the focused beam. The output of the photodetector comprises a signal that varies in consonance with the pits in the focused beam path. The output of the photodetector may be applied to suitable signal processing circuitry for recovering the information recorded on the disc record surface.

The light beam is focused through a window (not shown) formed in the side wall 6 of cartridge 2 to impinge on the information bearing surface 3 of disc record 4. To protect the surface of disc record 4, the window may be provided with a clear plastic or glass plate through which the playback/record light beam passes. In some optical systems, the disc record 4 is provided with an information bearing surface on both sides of the disc and, for this type of system, windows may be provided on side wall 8 as well as side wall 6 of cartridge 2.

Cartridge 2 is provided with a labyrinth of depressed and undepressed regions 10 on the inside rim 12 of side wall 6. Correspondingly, disc record 4 is provided with a series of depressed and non-depressed areas 14, the non-depressed areas being considered concentric grooves, which mate with the depressed and non-depressed regions 10 in the cartridge 2. Further, disc record 4 is provided with cap 16. Cap 16 and the labyrinth of depressed and non-depressed regions 10 and 14 effectively provide a seal for cartridge 2 that reduces or eliminates the chance of dust or debris from the outside world settling on the information bearing surface 3 of disc record 4.

Side wall 8 of cartridge 2 is provided with an annular region 18 which is compliant. The compliant region 18 may be a flexible diaphragm which connects central portion 20 of cartridge 2 with the outer portion of side wall 8. For example, compliant region 18 may be a section of side wall 8 of reduced thickness and formed in a corrogated fashion to afford movement of central portion 20 with respect to the remainder of cartridge 2. Central portion 20 includes a second wall 22 which forms a cavity 24. Enclosed in cavity 24 is a ring magnet 26 which is magnetized along the vertical axis of disc 4 to have a north/south magnetic orientation. The outside surface 28 of magnet 26 is tapered such that the magnet has a truncated conical shape. Conically shaped surface 28 of magnet 26 rests in a mating conically tapered bore 30 of cavity 24.

For assembly purposes the top surface of central portion 20 may be removable. During assembly cavity 24 would be open so that magnet 26 could be dropped in. After magnet 26 is dropped in position, the top surface of central portion 20 may be attached using screws or other means.

In FIG. 1, cartridge 2 enclosing disc 4 is shown positioned above turntable (spindle) 32 just before the record engages the turntable. Positioned in proximity to cartridge 2 is ram 34 which is accurately aligned with the axis of turntable 32 and can be lowered or raised while remaining on this same axis. Ram 34 contains a ring magnet 36 fixed to the ram. Magnet 36 is magnetized along the vertical axis such that the polarity of its lower surface is of the same polarity as that of the upper surface of magnet 26 in cartridge 2. The effect of this opposite polarity is a mutually repulsive force between the two magnets 26, 36 when they are brought into close proximity with one another.

Figure 2:
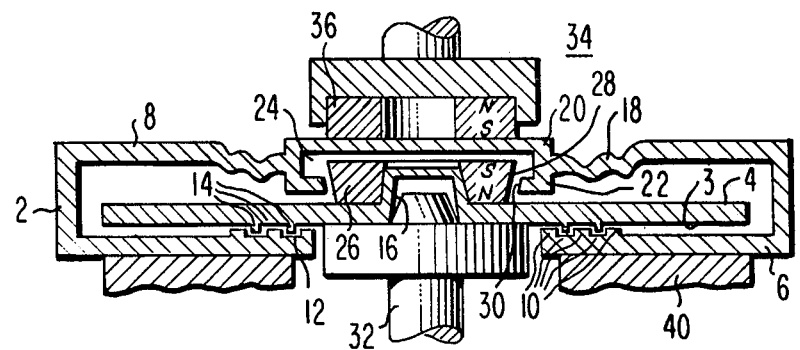
FIG. 2 is a side view, partially in cross-section, of the protective cartridge and disc record of FIG. 1, the record being mounted in operating relation with the turntable of the disc record/playback system.

Referring to FIGS. 1 and 2, an explanation of the operations of the protective cartridge, ram and turntable will be provided. FIG. 2 shows the disc placed on turntable 32. Disc 4 is accurately centered on turntable 32 by mating the tapered pilot diameter of turntable 32 with the inside diameter of the spindle hole in disc 4. Ram 34 has been lowered to deflect the compliant region 18 of the cartridge wall 8. Magnet 26 in the cartridge 2 has been pressed against disc 4 which, in turn, has been pressed against turntable 32 by the repulsive force between the two magnets 36 and 26. This pressure guarantees that the disc will rotate when spindle 32 rotates. The ram's downward motion is continued slightly beyond the point where magnet 26 comes to rest against disc 4. Thus, side wall 6 is pressed against the surface of reference structure 40. This additional ram motion deflects cartridge wall 8 such that the conical surface of cavity 24 is separated from the conical surface of magnet 26. In the play/record position, disc 4 is free to rotate with turntable 32 while pressed thereagainst. Disc 4 may rotate on turntable 32 without any rubbing contact with cartridge 2.

Figure 3:
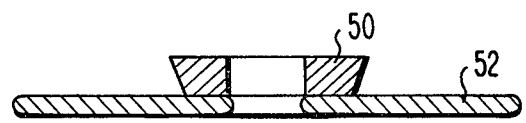
FIG. 3 is a side view, partially in cross-section, of a portion of a record disc and holding means therefor, exhibiting a construction in accordance with the principles of the present invention.

Referring to FIG. 3 an arrangement of magnet 50 and disc 52 is shown. The arrangement of FIG. 3 may reduce the lateral movement of the magnet during ram motion. Referring again to FIG. 2, it can be seen that magnet 26 may shift laterally as ram 34 descends if the inside diameter of the annular magnet does not mate tightly with the outside diameter of cap 16 of disc 4. The arrangement of FIG. 3 provides a technique for reducing lateral motion. In accordance with this arrangement, magnet 50 is bonded by an adhesive, for example, epoxy, to disc 52 such that when the upper magnet approaches magnet 50, magnet 50 cannot shift laterally with respect to disc 52. It should be noted that if magnet 50 is adhesively bonded to disc 52 that it may be necessary to extend the labyrinth 10, 14 of FIGS. 1 and 2 to provide dust and debris protection.

What is claimed is:

1. In a system for recovering or recording information signals, said information signals being recovered or recorded on a disc record, said system including rotatable support means for rotatably supporting said record, an apparatus comprising:

a cartridge having a chamber for enclosing said disc record;

said cartridge also having a cavity, a surface of said cavity having a conical shape; and magnetic holding means for magnetically holding said disc record against said rotatable support means, a surface of said magnetic holding means having a conical shape, said conical shape of said magnetic holding means being complementary to the conical shape of said cavity, said magnetic holding means being located within said cavity and arranged to move axially with respect to said disc record, said magnetic holding means being retained within said cavity by said cavity surface having a conical shape.

2. The apparatus according to claim 1 further comprising:

actuating means for actuating said magnetic holding means such that said disc record is coupled to said rotatable support means when said actuating means is proximate to said magnetic holding means.

3. The apparatus according to claim 2 wherein said magnetic holding means comprises a first magnet.

4. The apparatus according to claim 3 wherein said actuating means comprises a second magnet.

5. The apparatus according to claim 4 wherein said first and second magnets are arranged to effect engagement of said disc record with said rotatable support means by a repulsive magnetic force.

6. The apparatus according to claim 5 wherein said first magnet is adhesively bonded to said disc record.

7. In a disc record or playback system for recording or retrieving information signals on a disc shaped record medium, said record medium having an engagement portion located centrally thereon, said system comprising: rotatable support means for rotatably supporting said record medium and movable engagement means for effecting an engagement of said record medium with said support means, a cartridge for protecting said record medium comprising:
 an enclosure for housing said disc shaped record medium, said enclosure having first and second opposing side walls, said first side wall having an opening for exposing said engagement portion of said record medium;
 said second side wall including a central portion having a cavity therein and a compliant annular section circumscribing said central portion to thereby permit deflection of said central portion in an axial direction with respect to said record medium by said engagement means; and
 means retained within said central portion cavity for clamping said record medium to said support means, said clamping means urging engagement of said record medium with said support means when said engagement means deflects said central portion toward said record medium.

8. The cartridge according to claim 7 wherein said clamping means is disengaged from said central portion when said record medium rotates on said rotatable support means, said clamping means being spaced from said central portion when said engagement means deflects said central portion.

9. In a disc record or playback system for recording or retrieving information signals from a disc shaped record medium, said system comprising: a turntable for rotatably supporting said record medium and magnetic actuating means for magnetically actuating an engagement of said record medium with said turntable, a cartridge for protecting said record medium comprising:
 an envelope for enclosing said disc shaped record medium, said envelope including first and second side walls;
 said second side wall including a central portion having a cavity therein and a compliant annular section circumscribing said central portion; and
 a magnet movably housed within said cavity, said magnet responding to said magnetic actuating means by moving into contact with said record medium, said magnet holding said record medium against said turntable when said magnetic actuating means urges said magnet into contact with said record medium.

10. A disc record or playback system for recording or retrieving information signals on a disc shaped record medium, said record medium having an engagement portion located centrally thereon, said system comprising:
 rotatable support means for rotatable supporting said record medium;
 an enclosure for protecting said record medium, said enclosure having said first and second opposing side walls, said first side wall having an opening for exposing said engagement portion of said record medium, said second side wall including a central portion and a compliant annular section, said compliant annular section circumscribing said central portion, said central portion having a cavity;
 magnetic actuating means for magnetically actuating an engagement of said record medium with said rotatable support means; and
 a magnet, movably enclosed in said cavity, said magnet responding to said magnetic actuating means by moving into contact with said record medium, said magnet holding said record medium fixedly engaged with said rotatable support means during recording and retrieving operations.

* * * * *